Dec. 24, 1940. H. H. ASBRIDGE 2,225,761
SPINDLE BEARING
Filed July 17, 1939
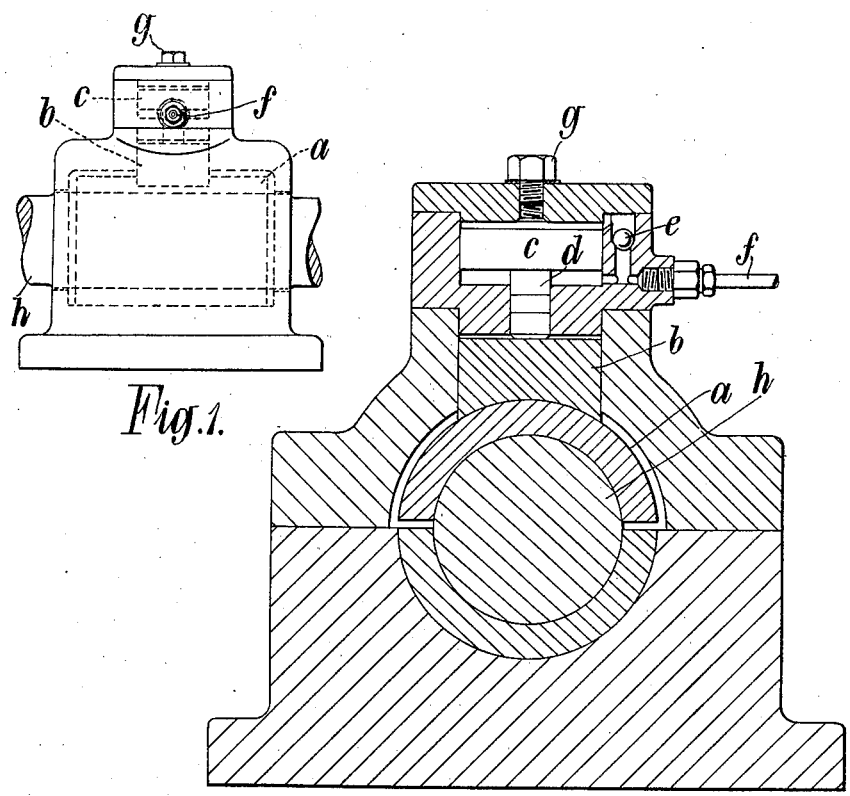
Fig.1.
Fig.2.
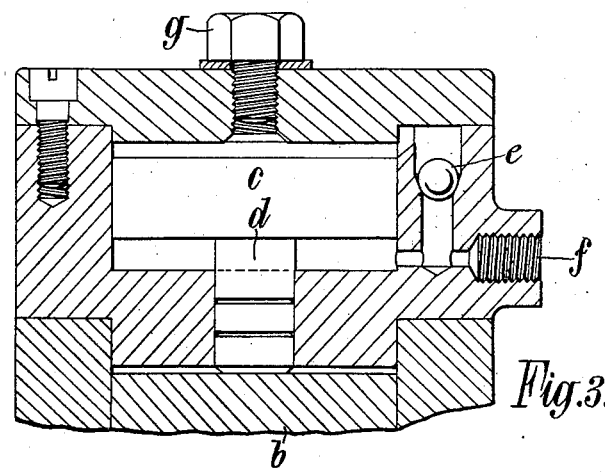
Fig.3.
Inventor
H. H. Asbridge
by Glascock Downing & Seebold
Attys.

Patented Dec. 24, 1940

2,225,761

UNITED STATES PATENT OFFICE 2,225,761

SPINDLE BEARING

Harry Hales Asbridge, Ashton-on-Mersey, England, assignor to The Churchill Machine Tool Company, Limited, Broadheath, near Altrincham, England, a British company Application July 17, 1939, Serial No. 284,982
In Great Britain December 15, 1938

2 Claims. (Cl. 308—9)

This invention relates to spindle journal bearings of the hydraulically loaded adjustable type, such as are used in machine tools where the maintenance of a close running fit is essential.

In the specification of my prior Patent No. 2,028,487, I have described and claimed a spindle journal bearing in which the loading of the adjustable member or shoe is effected by hydraulic pressure obtained by way of a non-return valve.

The object of the present invention is to provide an improved hydraulic loading arrangement of the type described and claimed in the aforesaid patent, in which a more accurate loading of the bearing is obtained under all running conditions, together with efficient means of preventing rapid movement or chatter of the bearing shoe due to varying loads on the rotating shaft within the bearing.

The invention comprises a hydraulically loaded spindle journal bearing in which the hydraulic pressure is applied to both sides of a piston which loads the bearing through its piston rod so that the resultant load upon the bearing is represented by the hydraulic pressure applied to the cross sectional area of the piston rod, the hydraulic fluid for the outer side of the piston being supplied through a non-return valve for the purpose specified.

Referring to the accompanying explanatory drawing:

Figure 1 is an elevation and Figure 2 a cross-sectional view of a hydraulically loaded bearing constructed and arranged in one convenient form in accordance with this invention.

Figure 3 is an enlarged view of the hydraulic loading means shown in Figure 2.

The hydraulic loading of the bearing bronze or shoe $a$ is effected through a pad or block $b$ by a piston $c$, the rod $d$ of which engages the pad or block which bears upon and may be secured to said bronze or shoe. The hydraulic pressure is applied to both sides of the piston $c$ so that the resultant loading pressure upon the bearing is represented by the hydraulic pressure applied to the area of the piston rod section.

The hydraulic pressure applied to the outer or larger effective area side of the piston $c$ is by way of the non-return valve $e$ which prevents flow in a direction away from the piston so that the trapped fluid acts as a dash-pot to prevent rapid movements of the bronze or shoe due to the varying loads on the shaft within it.

The hydraulic fluid for both sides of the piston is obtained from a common supply passage $f$ but that for the upper or outer side of the piston has to pass the non-return valve $e$ which traps the fluid at that side, so that lifting of the spindle due to varying loads thereon is opposed by a hydraulic lock.

An air venting plug $g$ may be fitted to the top of the cylinder in which the piston moves.

The fluid pressure for loading the bearing is preferably obtained from a pump driven in unison with the shaft $h$ in the bearing, there being a release valve to limit the pressure to a desired maximum valve.

The rod $d$ may be separate from the piston $c$ if desired.

With my new arrangement, hydraulic fluid at high pressures can be used with the effective area loaded by such pressure limited to that of the piston stem. Equality of pressures at opposite sides of the piston limits the leakage area to around the stem.

What I claim is:

1. A hydraulically loaded spindle bearing comprising two portions, one portion being fixed and the other movable towards and from said fixed portion, together with means to apply a hydraulic load to said movable portion comprising a hydraulic cylinder, a piston therein, a piston rod at one side only of said piston arranged to transmit force from said piston to said movable portion, a non-return valve and means to admit hydraulic fluid under pressure simultaneously to the side of said piston at which said piston rod is located, and past said non-return valve to the other side of said piston.

2. A hydraulically loaded spindle bearing comprising two portions, one portion being fixed and the other movable towards and from said fixed portion, together with means to apply a hydraulic load to the said movable portion comprising a hydraulic cylinder, a piston therein having different effective areas at its opposite sides arranged to apply pressure to said movable portion on movement towards it, the side of said piston having the larger effective area being that remote from the movable portion of said bearing, means to lead hydraulic fluid under pressure from a common source to both sides of said piston simultaneously and a non-return valve so disposed that fluid to that side only of said piston having the larger effective area must pass and is hydraulically locked by said non-return valve.

HARRY HALES ASBRIDGE.